(12) United States Patent
Hoegerl et al.

(10) Patent No.: US 9,177,181 B2
(45) Date of Patent: Nov. 3, 2015

(54) SECURE EPASS BOOKLET BASED ON DOUBLE CHIP TECHNOLOGY

(75) Inventors: Juergen Hoegerl, Regensburg (DE); Frank Pueschner, Kelheim (DE); Peter Stampka, Burglengenfeld (DE); Michael Huber, Nittendorf (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 688 days.

(21) Appl. No.: 13/450,510

(22) Filed: Apr. 19, 2012

(65) Prior Publication Data

US 2013/0278378 A1    Oct. 24, 2013

(51) Int. Cl.
*G06K 7/04* (2006.01)
*G06K 7/10* (2006.01)

(52) U.S. Cl.
CPC .................................. *G06K 7/10158* (2013.01)

(58) Field of Classification Search
CPC ... G06F 21/35; G06F 2221/2113; H04L 9/32; H04L 63/0492; H04L 63/105; H04L 2209/805; H04L 63/0442; G06K 19/072; G06K 19/0723; G06K 19/07749
USPC ......... 340/10.1, 10.2, 10.3, 10.4, 10.41, 10.5, 340/10.51, 572.1, 572.7
See application file for complete search history.

(56) References Cited

U.S. PATENT DOCUMENTS

| 2009/0224058 A1* | 9/2009 | Savry | 235/492 |
| 2012/0293308 A1* | 11/2012 | Steeves | 340/10.3 |
| 2013/0181056 A1* | 7/2013 | Itay et al. | 235/492 |
| 2013/0207783 A1* | 8/2013 | Cruzado et al. | 340/10.5 |

* cited by examiner

*Primary Examiner* — Nabil Syed

(57) ABSTRACT

A tamper-evident credential has a radio frequency identification (RFID) package with a first antenna and a subordinate antenna, RFID package defining a first part of the credential. The credential also has a subordinate RFID package defining a second part of the credential. The subordinate RFID package selectively coupled to said subordinate antenna so that an interrogation signal applied to said first antenna package is transmitted to the subordinate RFID package across said subordinate antenna.

15 Claims, 3 Drawing Sheets

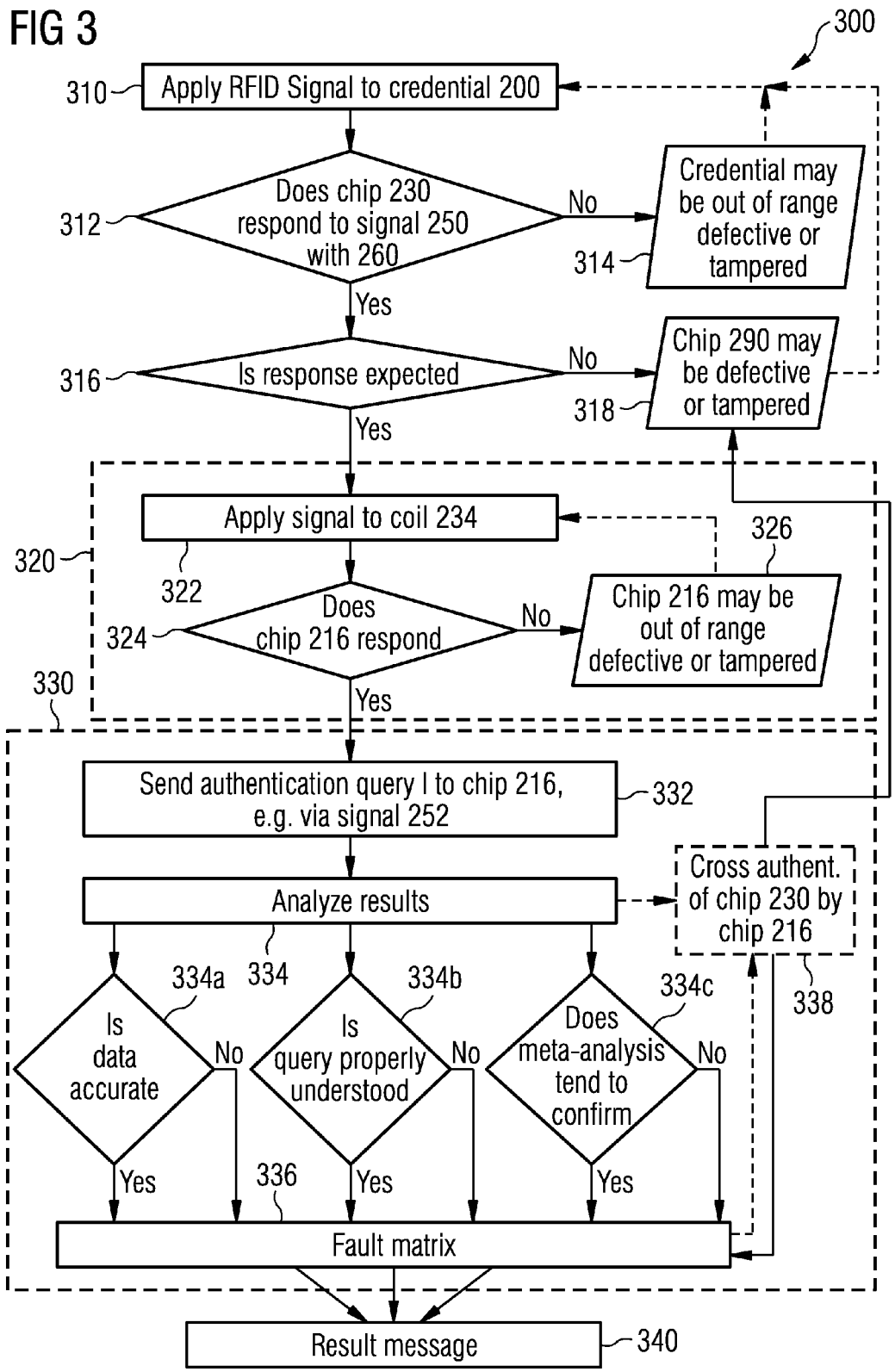

SECURE EPASS BOOKLET BASED ON DOUBLE CHIP TECHNOLOGY

TECHNICAL FIELD

Various aspects of the disclosure relate generally to radio frequency identification (RFID) chip card technology and to data security using multiple RFID chips.

BACKGROUND

Radio-frequency identification (RFID) is the use of a wireless non-contact system that uses radio-frequency electromagnetic fields to transfer data from a tag attached to an object, for the purposes of automatic identification and tracking. Some tags require no battery and are powered by the electromagnetic fields used to read them. Others use a local power source and emit radio waves (electromagnetic radiation at radio frequencies). The tag contains electronically stored information which can be read from up to several meters (yards) away. Unlike a bar code, the tag does not need to be within line of sight of the reader and may be embedded in the tracked object.

RFID tags are used in many industries. An RFID attached to an automobile during production can be used to track its progress through the assembly line. Pharmaceuticals can be tracked through warehouses. Livestock and pets may have tags injected, allowing positive identification of the animal. RFID identity cards can give employees access to locked areas of a building, and RF transponders mounted in automobiles can be used to bill motorists for access to toll roads or parking.

In an effort to make passports more secure, several countries have implemented RFID in passports. Through implementation of passports using RFID for storage of personal data (e.g. first and last name, date of birth, fingerprints and/or photographs) information about a passport holder can now be scanned and read, such as at a customs checkpoint, making the RFID part of the security features of the passport.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the disclosure of the invention are described with reference to the following drawings, in which:

FIG. 3 is a flowchart of a method for verifying an RFID-equipped credential according to an aspect of the disclosure.

DESCRIPTION

The following detailed description refers to the accompanying drawings that show, by way of illustration, specific details and aspects of the disclosure in which the invention may be practiced. These aspects of the disclosure are described in sufficient detail to enable those skilled in the art to practice the invention. Other aspects of the disclosure may be utilized and structural, logical, and electrical changes may be made without departing from the scope of the disclosure. The various aspects of the disclosure are not necessarily mutually exclusive, as some aspects of the disclosure can be combined with one or more other aspects of the disclosure to form new aspects of the disclosure. The following detailed description therefore is not to be taken in a limiting sense, and the scope of the present disclosure is defined by the appended claims.

Various aspects of the disclosure are provided for devices, and various aspects of the disclosure are provided for methods. It will be understood that basic properties of the devices also hold for the methods and vice versa. Therefore, for sake of brevity, duplicate description of such properties may be omitted.

The term "at least one" as used herein may be understood to include any integer number greater than or equal to one.

The term "a plurality of" as used herein may be understood to include any integer number greater than or equal to two.

The terms "coupling" or "connection" as used herein may be understood to include a direct "coupling" or direct "connection" as well as an indirect "coupling" or indirect "connection", respectively.

The term "credential" as used herein may be understood to include any document or plurality of documents in physical form, which, taken individually or together serve as an attestation of identity, qualification, license, authenticity, authority or relationship of an individual, group of individuals, association or organization. In a broader sense, as used herein, the term credential may apply to any secure document, including currency and other bearer instruments, articles of personal property, or as evidence of trademark.

The term "embedded" as used herein may be understood to include any form of physical attachment, including encapsulation or placement on, within or outside an object.

The terms "coil" and "antenna" are used interchangably in connection with description of the structure of RFID devices, reflecting not only the typical helical form of an RFID antenna, but also its dual function as a source of power for the RFID device, and for data communication respectively.

The term "chip" or "package" in the context of an RFID device is intended to encompass a plurality of components that may be connected to a coil/antenna to carry out the RFID function, whether or not such components are necessarily found on a semiconductor "chip" as that term is generally understood.

Figure 1:
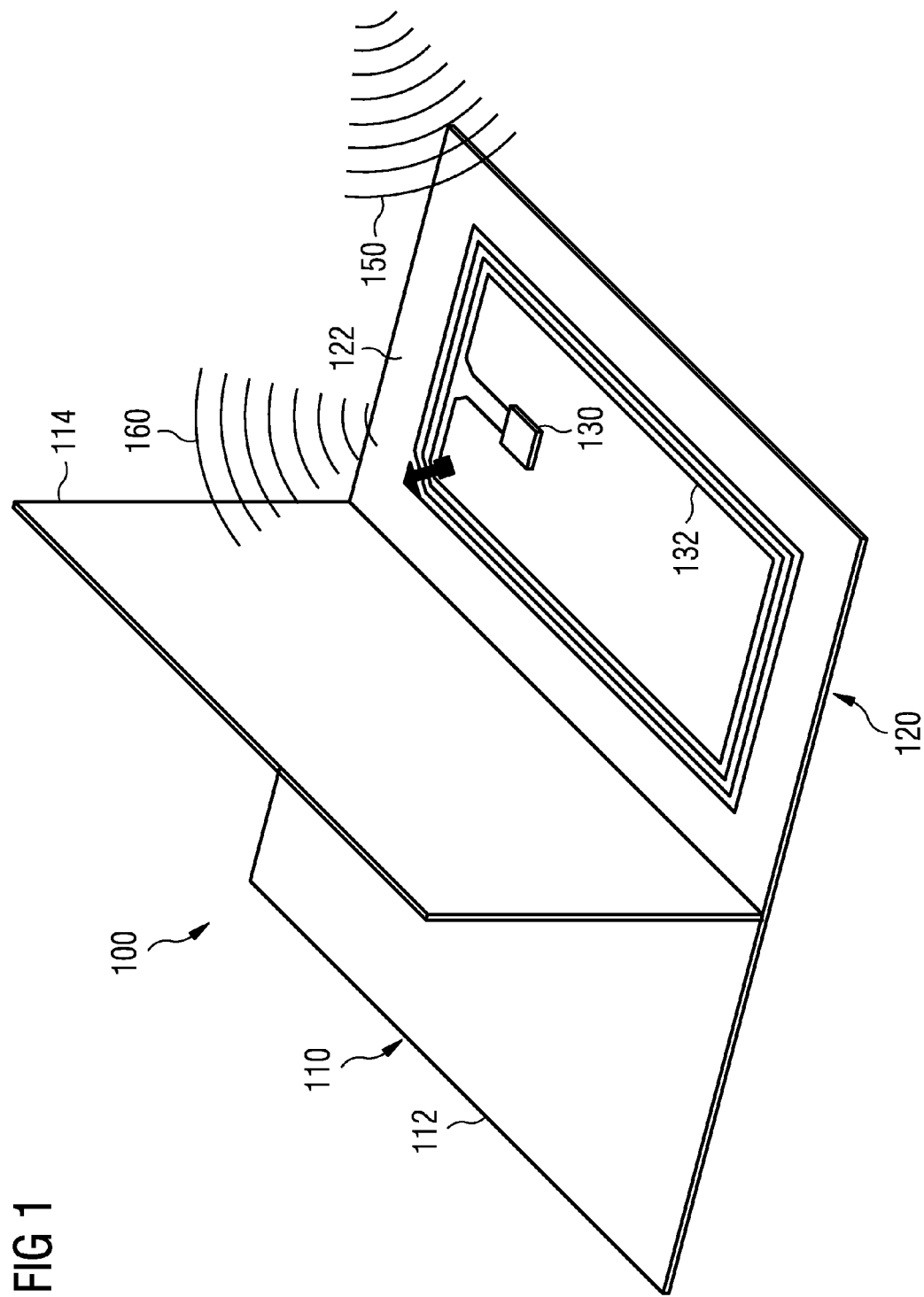
FIG. 1 shows a simplified diagram of an RFID-equipped credential, such as a passport.

FIG. 1 shows an RFID equipped credential 100, such as a passport. Depending upon the configuration of credential 100, it can take the form of a plurality of document pages 112 that may form booklet 110 of credential 100. At least one page of credential 100 typically contains a data page 114 on which information relating to the credential may be printed. For example, in a typical United States passport, personal information and a photo are printed in human- and/or machine-readable form on the data page.

Credential 100 also includes data compartment 120 which houses chip (or package including chip) 130 and related circuitry. In particular, chip 130 is coupled to antenna/coil 132, typically by direct connection, capacitively or by induction. Also typically, chip 130 and coil 132 generally follow the topology of the credential in which they are embedded. For example, the data compartment 120 is flat and oriented in a single plane, with chip 130 and coil 132 formed likewise, suitable for encapsulation within booklet cover 122. Alternatively, data compartment 120 may be formed between data page 114 and booklet cover 122, or elsewhere in credential 100. The specific location of an RFID package is not critical per se.

Chip 130 typically includes non-volatile memory containing information found on data page 114, and/or other information related to credential 100 and/or its holder. In operation, credential 100, and in particular data compartment 120 is placed within an electric field 150 generated, for example by an RFID reader (not shown), the electric field inducing an electric current in antenna/coil 132 sufficient to power chip 130. Electric field 150 may also take the form of an RF signal, and may carry a data signal for reception by chip 130.

While thus powered, chip 130 is capable of two-way data communication via antenna/coil 132 with a receiving unit, such as an antenna of an RFID reader (not shown). Transmission of signals 150/160 are typically radio-frequency signals received and transmitted respectively via coil 132 between a receiving device such as an RFID reader and the chip 130. In this sense, coil 132 acts as an antenna in addition to a power source. According to an aspect of the disclosure, two-way communication between RFID reader and chip advantageously provide for query-response that may increase the security of the data on chip 130, reducing the likelihood that the data can be extracted by unauthorized reading.

In the event that chip 130, or other components in data compartment 120 become damaged or inoperative, such as by physical mutilation, flexing, or exposure of credential 100 to environments outside the design limits of the data components such as chip 130 or coil 132, a receiving device such as an RFID reader would be unable to reliably obtain the data stored in chip 130. In such a case, manual reading, by machine or person, of redundant information printed on data page 114 is ideally sufficient to serve the function of supporting the credential. For example, a U.S. passport does not lose its validity due to the inability of its RFID chip to be read.

Overt destruction of chip 130 and its supporting components, however, leading to a lack of functionality of the readability of credential 100 through means of RFID is not the only risk associated with the use of RFID technology in connection with a passport or similar identifying credential. In fact, the deliberate destruction or removal of chip 130 for purposes of replacing or reprogramming it, present what may be a greater risk.

An RFID-enabled credential with an obviously malfunctioning RFID capability inherently calls attention to the credential, raising a 'red flag' which may lead to more detailed scrutiny of the credential or additional verification before the credential is accepted as authentic. By contrast a seemingly functional RFID containing data consistent with a falsified credential would not raise suspicion and therefore would be more likely to be accepted as authentic. In this way RFID technology may inadvertently build in a kind of human complacency to the credential authentication process that may be predictable, and therefore exploited. For example, the replacement of fingerprint data on chip 130 with fingerprints inconsistent with the name or photo printed on data page 114, may falsely convince border control personnel to admit an imposter without further questioning.

Without a native tamper-detection capability, there is no rigorous and direct way to determine whether a particular RFID device that is superficially functional has been tampered with, or may itself be merely a stand-in for chip 130. Likewise there is no way to determine whether a malfunctioning RFID has been deliberately rendered inoperative, or whether data obtained via RFID is from the original RFID chip or from a counterfeit chip deliberately secreted within the credential, even outside its data compartment. In accordance with an aspect of FIG. 1 as described above, there is no way indicated for an ostensibly functioning RFID enabled credential to signal the operator of an RFID reader that data obtained is suspect, and should be independently verified.

Figure 2:
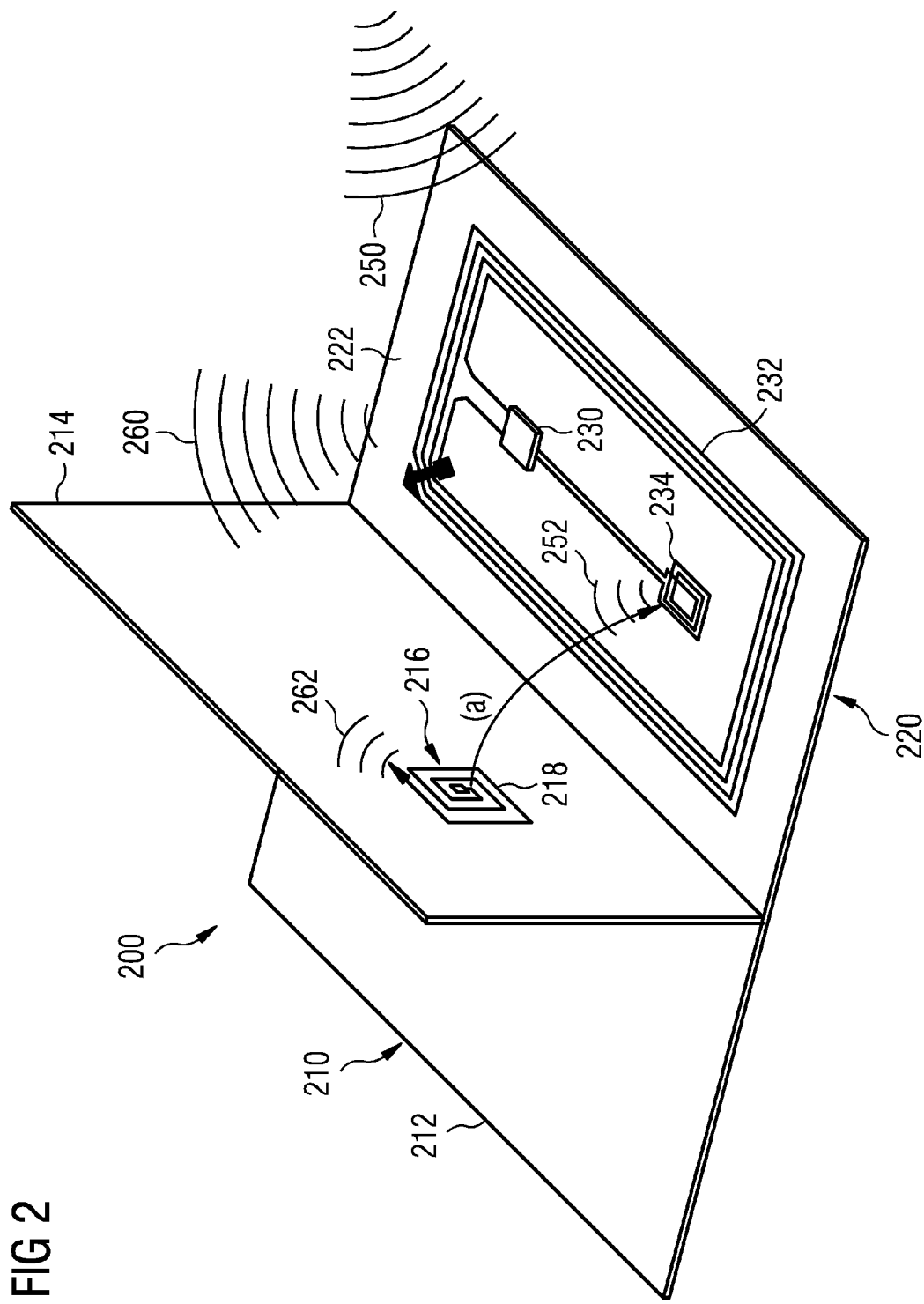
FIG. 2 shows an implementation of an RFID-equipped credential according to an aspect of the disclosure.

FIG. 2 discloses a tamper-evident RFID system implemented in credential 200. In a manner similar to credential 100 of FIG. 1, credential 200 is shown having a plurality of pages 212 forming a booklet 210. Likewise, data compartment 220, which is shown embedded in cover 222 includes chip 230 and an antenna/coil 232. Chip/package 230 may be similar to chip 130 to the extent that it advantageously includes at least a non-volatile memory for storing data. Additionally, credential 200 is provided with a second, subordinate coil/antenna 234, coupled to chip 230. According to an aspect of the disclosure, coil/antenna 234 is parasitic in that it draws power from chip 230.

Pages 212 of credential 200 likewise include data page 214, typically having machine- and/or human readable data entries printed thereon. Additionally, data page 214 is provided with chip or package 216 which may include an RFID chip including, for example, at least a non-volatile memory for storing data, and an antenna/coil 218 which may be integrated into chip/package 216 in the form of a coil formed thereon and coupled thereto. Either one or both of chips 230 and 216 typically store at least one of the data entries printed on data page 214.

Advantageously, chip 216 is embedded within data page 214 such that at least coil 218 can be variably positioned in sufficiently close proximity to subordinate coil 234 for purposes of establishing a coupling, such as a capacitive or inductive coupling between coils 218 and 234. For example, as shown by arc 'a', coil 218 is shown in a position variably along a path corresponding to subordinate antenna/coil 234. In particular, when booklet 210 is closed, data page 214 is substantially adjacent to booklet cover 222, which contains data compartment 220. By virtue of its connection to subordinate antenna/coil 234, chip 216 may also be considered "subordinate" to chip 230.

For purposes of this disclosure, "substantially adjacent" is intended to include proximities allowing for the thicknesses of data page 114 and that of cover 222 as well as one or more pages 112 positioned therebetween. In any case, according to an aspect of the disclosure, data page 114 is deemed substantially adjacent to cover 222 when these parts of credential 200 are positioned as when booklet 210 is closed.

During operation, in a similar manner to FIG. 1, described above, credential 200, and in particular data compartment 220 is placed within an electric field 250, such as generated by an RFID reader. In so doing, the electric field induces an electric current in coil 232 sufficient to power chip 230. While powered, chip 230 is capable of two-way data communication with the RFID reader through radio-frequency signals 260 transmitted between the RFID reader and the chip via coil 232, which acts as an antenna. Additionally, chip 230 may selectively energize subordinate coil 234 to generate second electromagnetic field 252 from coil 234. Parasitic coil 234 is in this sense 'subordinate' to chip 230, and coil 232 which powers both chip 230 and coil 234.

When coil 218 is within range of antenna/coil 234 such that coil 218 and coil 234 are sufficiently coupled to enable signal transmission across the coupling, two-way data communication between chip 216 and chip 230 can take place such as via signals 252/262. Although this may occur at greater distances, such coupling occurs, according to an aspect of this disclosure, at least when data page 214 and booklet cover are substantially adjacent to each other. Likewise, movement of data page 214 along arc (a) while credential 200 is open may permit sufficient variability in proximity to selectively make and break any coupling between coils 218 and 234. For example, movement of data page 214 along arc (a) at greater than 45 degrees from booklet cover 222 is advantageously sufficient to break a coupling between coils 234 and 218 that may have existed at an angle of less than 45 degrees between page 214 and cover 222.

In particular, according to an aspect of the disclosure, coil 218 may be energized by signal 252 sufficiently to power chip 216. Additionally, signal 252 may include a data signal readable by chip 216. Alternatively, or in addition, chip 216 may be powered by signal 250, which signal may also contain a data signal readable by chip 216.

According to an aspect of the disclosure, the powering of chip 216 in whole, or in part by signal 250 may provide the advantage of limiting power required by subordinate coil 234 to transmit/receive data across signals 252/262. In such a configuration it may be advantageous to limit the influence of signal 250 to that of providing power to chip 216, with the result that some or all of the authentication-related communication between chips 216 and 230 remain internal to the RFID system of credential 200. In particular, chip 216 could be configured to receive at least part of its power-generating signal from signal 250, and confine at least part of its data communication to coil 234.

As noted above, the proximal coupling, such as by capacitive or inductive contact, between coils 218 and 234 facilitates two-way communication between chips 216 and 230. For example, through the selective energizing of coil 218, data may be exchanged between chips 216 and 230. In particular, the nature of the exchange may involve data entries redundant to those printed on data page 214, and stored in one of chips 216 or 230. However, advantageously, the interaction of chip 216 with chip 230 can also, or instead, function in the unilateral or mutual authentication of the integrity of chips 216 and/or 230, respectively.

According to an aspect of this disclosure, chip 230 may interrogate chip 216. The interrogation, for example, may serve to authenticate chip 216, and/or to confirm its integrity. In such a case, for example, upon receiving a query from, or being energized by signal 250, such as in the manner described above with respect to FIGS. 1 and 2, chip 230 may selectively energize coil 234, resulting in the transmission of signal 252 therefrom. Depending on the proximity of coil 218 to coil 234, sufficient energy from signal 252 may be absorbed by coil 218, resulting in the activation of chip 216. Chip 216 then, depending on its configuration, may transmit unique information in the form of data that establishes the authenticity of chip 216. More particularly, chip 216 may transmit a digital key that identifies it as authentic. Alternatively or additionally, chip 216 may selectively transmit one or more portions of data, such as data stored in data page 214.

Transmission of correct, or expected, data would then tend to show that chip 216 is present, operational, and verifiably authentic. Conversely, failure of chip 230 to receive the key or data in response to energizing coil 234 serves as evidence that chip 216 is absent, malfunctioning, or has had its integrity compromised. Likewise, transmission of incorrect data by chip 216 would also tend to indicate that chip 216 is either malfunctioning, or inauthentic.

The authenticity of chip 216 can advantageously be determined by progressive interrogations, each of which are calculated to establish the status of chip 216 with a progressively greater degree of certainty. For example a first test establishing the reliability of two-way communication between chips 230 and 216 via coils 234 and 218 respectively serves not only to confirm appropriate placement of coil 218 proximal to coil 234, but also indirectly whether signal 250 is present in sufficient strength to supply power to both chips 230, and through chip 230 to chip 216.

Further queries, intended to establish the provenance of chip 216 as well as the integrity of data stored in the memory thereof may then advantageously be posed, the responses, if any, compared to redundant data, in order to detect potential tampering with credential 200. FIG. 3 is a flowchart illustrating an exemplary interrogation process 300 consistent with an aspect of the current disclosure for establishing the authenticity of credential 200.

At 310, credential 200, and more particularly data compartment 220 is placed within the electromagnetic field of RFID signal 250. RFID signal 250 is expected to excite coil 232, resulting in the application of current to chip 230. If no response via signal 260 is detected at 312, credential 200 is likely out of range, or if in range, non-functioning defective, triggering a message 314 to that effect. In such a case, application of RFID signal 250 to credential 200 may be repeated, as may be deemed appropriate.

In general, the response may take the form of a confirmation signal generated via coil 232 and received as signal 260. The response itself may also contain data, such as data stored in chip 230. If a response is received, but the response is determined at 316 to be abnormal, or to result in transmission of a response other than an expected confirmation or transmission of data, the result would tend to indicate that the credential, although in range of signal 250, is not functioning normally, triggering a message 318 to that effect, thereafter optionally looping back to 310.

By contrast, a normal response to signal 250 would tend to indicate that the basic components of the package including chip 230 and antenna 232 are functioning as expected. According to an aspect of this disclosure, this would trigger 320, the authentication of chip 216.

At 322 chip 230 energizes coil 234. If chip 216 does not respond, this would tend to indicate that chip 216 is out of range, is malfunctioning or has been tampered with, triggering message 326 to that effect, thereafter optionally looping back to 322. Message 326 may be generated by chip 230 and transmitted such as by signal 260 to an RFID receiver.

By contrast, detection of a response from chip 216 would indicate that at least coil 218 of chip 216 is within range of coil 234, and that the circuitry linking chips 216 and 230 is nominally functional. In particular, the response from chip 216 can take the form of any signal, including the exchange of data, that may confirm the quality and/or reliability of the communications link between chips 216 and 230.

Authentication of chip 216 is generally designated as 330 in FIG. 3. In general, 330 may comprise a series of query-response cycles initiated, for example, by chip 330, directed toward establishing the provenance of chip 216, as well as the integrity and content of its stored data. Accordingly, 330 may involve any of a wide variety of procedures that provide information specific to chip 216. For example, a query, such as from chip 330, may include a request for a digital key, cryptographic hash, or other encoded message which, if not properly provided, would tend to indicate that chip 216 has been tampered, replaced or damaged.

Moreover, the extent to which a properly formatted query is completely executed by chip 216 may tend to indicate whether the chip has been subject to tampering, or may be malfunctioning. Failure of chip 216 to respond completely to a particular query, as well as over-inclusive responses, such as a response including more data than requested, or data released without required security.

Multiple query levels can test different aspects of chip 216 in connection with its authenticity, and may provide important details as to particular security deficiencies present in chip 216. For example, queries requesting particular information from chip 216 may be parsed for consistency of content, while simultaneously testing for artifactual or 'meta-' features such as response time, signal quality, and other artifacts of chip 216 that may be aggregated to form a profile or 'fingerprint' unique to chip 216, independent of the data conveyed by the chip. Additionally, there may be detectable fluctuations in the signal strength of signal 260 corresponding to current drain caused by periodic activation of coil 232 during communication with chip 216 that may provide information relevant to the behavior of chip 216. Accordingly, where these meta-features of chip 216 manifest in known and detectable artifacts, any deviation observed during interaction with chip 216 may serve as indications and evidence of tampering, even where the query results themselves would not have raised a question of authenticity.

Likewise, the behavior of chip 230 is likely to feature artifacts unique to it, including features that can be observed directly, for example from the output of signal 260. Detectable artifacts unique to the wider package indicated by chip 230, in particular to the devices attached to it, including coil 234 may be detectable indirectly as, for example, interference patterns unique to the interaction between coil 234 and coil 218 may be detected and quantified. Such data may provide an aggregate suitable for a form bilateral authentication of chips 230 and 216.

As shown 330 includes a first authentication query 332, followed by analysis 334 of the output of chip 216. As noted above, the analysis may be as straightforward as judging whether the response provided matches an expected correct response 334a, was properly interpreted by chip 216 (334b), or may include a wide range of signal analysis 334c with the shared objective of determining whether the origin of the signal is authentic, i.e. whether it is the originally installed, chip 216. It is to be understood that the elements 334a-c of analysis 334 shown and described are only exemplary, and that any analysis of the behavior of the RFID components in credential 200 that tends to provide information relating to the authenticity of chip 216 could be used in analysis 334. Moreover, multiple layers of sub-analyses may be implemented depending upon the results of 334a-c.

Ultimately, the results of the plurality of analysis elements 334a-c and any sub-analyses are processed through fault matrix 336 which resolves the analysis results into a result message 340. Fault message 340 is formatted to communicates information related to the authenticity of chip 216, and can be transmitted, for example through chip 230/coil 232 to an RFID receiver.

The process shown in FIG. 3 and described above may be augmented by measures that increase the complexity and/or visibility of efforts to tamper with chip 216. Chip 216 could be provided, for example, in an ultra-thin format, suitable for embedding into a sheet of paper, for example 24 lb. bond paper used for the data page. Such construction, for example in which chip 216 may be integrated with its coil 218 (coil on CIS) would render tampering difficult. Overt destruction of the capability of chip 216 to communicate could also be made visible by use of an indicator substance within or on the paper of the data page that, for example, changes color after exposure to microwaves, extreme heat, or other applied environmental stresses.

In this way, the capabilities of chip 216 would be the electronic analogue to visible or obscured graphic watermarks such as found on the pages of a credential such as a passport. Under the right conditions, the presence of the chip, and the verifiable confirmation of its functionality, as well as the data stored on it, tend to establish the authenticity, not only of the data, but of the credential itself.

The process shown in FIG. 3 is described above with a focus on the function and authenticity of chip 216. In fact, as shown above, this focus accrues to the security of credential 200 as a whole, by increasing the likelihood that tampering with either chip 230 or chip 216 will be evident upon electronic inspection of the credential. To the extent that the contents of data compartment 220, e.g. the package/chip 230, are also vulnerable to deliberate destruction, such as by exposure to strong radiation (e.g. microwaves), extreme heat/cold or mechanical stresses, the surreptitious placement of a forged chip/coil package within the credential is rendered more complex, and therefore more difficult, by the design requirements of coil 232 of the disclosure.

A forged RFID package secreted within a passport, for example, may respond to signal 250, but would be less likely to properly establish communication with chip 216, without provision of a working, and properly placed substitute for coil 234. Without attention to this detail, application of RFID interrogation process 300 would never advance past 320, with the result that the RFID system would indicate, via message 326, that chip 216 is not responding. Although data may be read from the forged chip, the RFID operator would be alerted to the possibility that the fault identified in 320 lies in chip 230, rather than any defect in chip 216, and that the data obtained by the RFID in such a case may be treated as suspect.

In this way, interrogation process 300 serves indirectly to provide information relevant to the status of chip 230, or more precisely, the authenticity of data obtained during RFID scanning of credential 200. Again referring to the watermark function of chips 230 and 216, the absence of a readable chip 216 in any credential 200 submitted as authentic may be given analogous weight to that of a missing or defaced physical watermark (e.g. symbols provided, for example in ultraviolet ink on passport pages) printed on the data page, i.e. the credential should be treated with appropriate caution.

To the extent that chip 230 may be substituted by a forged chip, the forged chip also having the capability to establish reliable communication with chip 216, a robust cross-authentication scheme can be implemented within interrogation process 300 to prevent the forged chip from being mistaken for genuine. For example, chip 230 may be provided with half of a split cryptographic key. By embedding the corresponding key, for example in chip 216, making chips 230 and 216 a matched pair, secure challenges could be introduced that would further complicate reading of data from chip 216 by a forged chip in place of chip 230.

As shown in FIG. 3, following, or in addition to the analysis of results at 334, and/or during application of fault matrix 336, cross-authentication of chip 230 by chip 216 may be implemented. If cross-authentication 338 is performed, the results may be communicated as message 318, and/or may be fed back to fault matrix 336 for evaluation, and incorporation into the generation of result message 340. A signal 262 issued from chip 218 may initiate the cross-authentication, in which case, such signal may be deemed a third interrogation signal, independent of first and second, such as parts of 250 and 252, respectively.

The concept of a matched chip pair is particularly advantageous where a first secure facility may manufacture booklet cover 222 and a second compartmentalized facility manufactures the pages 212, including data page 114. In this manner, a breach of security in one facility, characterized by disclosure of secure key information, would not necessarily jeopardize credential 200 as a whole. Moreover, such a construction would guard against the simple deactivation of chip 230 and substitution by a forged chip, as the key stored in chip 230 would have to be known, or extracted prior to replacement by the forgery. Likewise, banknotes may have distinct facilities for the manufacture of paper, separate from facilities that perform printing. The embedding of a first chip in the paper, and a second chip affixed such as during printing, which, acting as a matched pair could be placed over one another and tested using RFID. Additional structures or measures may be implemented to increase the complexity involved in creating a forged chip 230 without deviating from the scope of this disclosure.

As set forth in FIGS. 2 and 3, the double-chip credential 200 relies on chip 230 to relay data from its own memory, as well as the results of interactions via coil 232 with chip 216. To the extent that chip 230 may be substituted by a forged chip, said forged chip being designed to mimic interactions with chip 216, in lieu of actual interrogation and cross-authentication of the chips, various techniques may be employed to further harden credential 200. For example, detection of signals 252 and/or 262 by an external RFID receiver during application of signal 250 to confirm that a link between chips 216 and 230 has been established. Alternatively, signal 250 can be calibrated to energize coil 218 directly, for example to directly confirm that a functioning chip 216 is present in credential 200. In such a case, chip 216 would operate outside the definition of a subordinate chip, chip 216 being able, even if only in a limited way, to communicate directly with an RFID receiver, without communicating through subordinate antenna/coil 234 of chip 230.

Further, the linking of additional chips, such as via capacitive or inductive coupling, to either chip 230 or chip 216 can provide redundancy and/or additional security for credential 200. The daisy-chaining of multiple chips may be possible where a second credential 200, depends for its validity on a separate credential. For example, the passport of a child may be configured to be linked via a subordinate antenna/coil to the passport of a parent. According to an aspect of the disclosure, chip 216 of the child's passport may, for example, be aligned with coil 234 of a parent's passport. Thus, authorities may confirm, not only whether both credentials 200 are authentic, but also whether a relationship exists between an adult, and for example, a minor credential holder sufficient to authorize international travel together.

According to an additional aspect of the present disclosure, the RFID components of credential 200 may be configured such that a link between chip 230 and chip 216 can only be established when coil 234 is in close proximity with coil 218. In the exemplary disclosure shown in FIG. 2, coil 218 is aligned such that laying data page 214 on top of booklet cover 222 will place coil 218 directly over and substantially adjacent to coil 234. Accordingly, a relatively low-power signal may be sufficient to establish reliable data communication between chip 230 and chip 216.

The provision of a low-power signal reduces the likelihood that data from chip 216 can be read externally, or that an external signal may interfere with the communication between chip 230 and chip 216. Moreover, the use of a low-power signal increases the coil alignment accuracy required to establish communication between chip 230 and chip 216, tending to increase the complexity, and difficulty, of efforts to circumvent the security of credential 200. Additionally, a low power signal is consistent with the parasitic relationship of subordinate antenna/coil 234.

Additionally, according to an aspect of the disclosure, signals 252 and 262 generated between chip 216 and 230 via the interface between coil 218 and subordinate coil 234 may advantageously take place using a different communication protocol, or, for example a different frequency from that employed in signals 250 and 260. In particular, to the extent that coils 218 and 234 are tuned to a different frequency, or if chip 216 is configured to respond to an incompatible protocol to that of coil 232, signals 250 and 260 are less likely to cause interference that may affect communication through subordinate coil 234.

According to an aspect of the disclosure, an additional feature of credential 200 may be that although data may be exchanged between chips 216 and 230 while booklet 210 is closed (owing to the proximity of data page 214 to booket cover 222 in the closed position), chip 230 can be configured not to transmit data personal to the credential holder until the coupling between chip 216 and 230 has been broken. In such a configuration, the method of FIG. 3 could be conducted while data page 214 is adjacent to booklet cover 222, and once having established result 340, then retrieving data by breaking the coupling (i.e. moving the data page away from the booket cover). Although this configuration adds an additional step to the credential scanning process, it would effectively prevent personal data from being read from credential 200, such as surreptitiously, while the credential is closed.

While the invention has been particularly shown and described with reference to specific aspects of the disclosure, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A credential verification system comprising:
    a first radio frequency identification (RFID) package embedded in a first part of said credential, the first RFID package comprising
        a first chip,
        a first RFID-readable data stored on the first chip
        a first antenna responsive to a first interrogation signal, the first antenna operatively connected to said first chip, and
        a subordinate antenna for generating a second interrogation signal, the subordinate antenna operatively connected to said first chip; and
    a second RFID package embedded in a second part of said credential variably proximal to the first part of said credential, the second RFID package comprising
        a second chip, and
        a second antenna responsive to said second interrogation signal, the second antenna operatively connected to said second chip and selectively coupled to said subordinate antenna, wherein
        at least a portion of said first RFID-readable data is obscured when the second chip is coupled to the subordinate antenna.

2. The credential verification system of claim 1 wherein said credential further comprises a data portion, the data portion, including one of at least a human-readable entry and a machine readable entry, related to the holder of the credential.

3. The credential verification system of claim 2, wherein said first antenna is responsive to signals of a first frequency, and said second antenna responsive to signals of a second frequency different from said first frequency.

4. The credential verification system of claim 3, wherein said selective coupling of the second antenna is established by at least one of a capacitive coupling and an inductive coupling.

5. The credential verification system of claim 4 wherein said selective coupling is dependent upon the proximity of the second part of said credential to the first part of said credential.

6. The credential verification system of claim 4 wherein at least a portion of said machine readable entry is stored in said second chip.

7. The credential verification system of claim 6 further comprising a security feature divided between the first chip and the second chip wherein said first chip and said second chip are cross-identifiable based on said security feature.

8. The credential verification system of claim 5 wherein said coupling occurs only when the second part of said credential is substantially adjacent to the first part of said credential.

9. The credential verification system of claim 5 wherein data can be read from said second chip only when said second antenna and said subordinate antenna are coupled.

10. The credential verification system of claim 5 wherein data can be read from said first chip only when said second antenna and said subordinate antenna are not coupled.

11. A method for wireless electronic verification of a credential, comprising:
applying a first interrogation signal to a first radio frequency identification (RFID) package having a subordinate antenna operatively connected to a first chip containing RFID-readable data, the first RFID package embedded in a first part of said credential,
placing a second RFID package embedded in a second part of said credential proximally to the first RFID package,
selectively transmitting, responsive to said first interrogation signal, a second interrogation signal using the subordinate antenna,
analyzing the response to said second interrogation signal,
generating a first result message indicative of the authenticity of said second RFID package, and
obscuring at least a portion of said RFID-readable data when said second RFID package is indicated as authentic.

12. The method of claim 11 wherein the first RFID package includes a first antenna, operatively connected to the first chip, the method further comprising: transmitting said first result message using the first antenna.

13. The method of claim 12 wherein the second RFID package includes a second chip and a second antenna operatively connected to the second chip, the method further comprising transmitting data stored in the second chip to said first chip.

14. The method of claim 11 further comprising:
analyzing a response to said first interrogation signal by said first RFID package prior to transmission of said second interrogation signal, and
generating an intermediate result message indicative of the authenticity of said first RFID package.

15. The method of claim 13 further comprising:
cross-authentication of said first RFID package by a third interrogation signal transmitted from said second antenna; and
generating a second result message indicative of the authenticity of said first RFID package.

* * * * *